April 30, 1974　　　M. E. NEEL　　　3,808,123
METHOD AND APPARATUS FOR THE TREATMENT
OF INFLUENT WATERS SUCH AS SEWAGE
Filed Dec. 14, 1971　　　　　　　　　　5 Sheets-Sheet 5

Marvin E. Neel
INVENTOR.
BY
ATTORNEYS

United States Patent Office 3,808,123
Patented Apr. 30, 1974

3,808,123
METHOD AND APPARATUS FOR THE TREATMENT OF INFLUENT WATERS SUCH AS SEWAGE
Marvin E. Neel, Port Arthur, Tex., assignor to Joseph Lyday and Thomas A. Thomas, Port Arthur, and Clarence Buford, Bridge City, Tex., fractional part interest to each
Continuation-in-part of abandoned application Ser. No. 845,927, June 25, 1969. This application Dec. 14, 1971, Ser. No. 207,783
Int. Cl. C02c 1/12, 5/06
U.S. Cl. 210—15                                29 Claims

ABSTRACT OF THE DISCLOSURE

The present invention is directed to method and apparatus for treating influent waters such as sewage, waste water, discharges from petroleum or chemical plants, or other materials requiring oxidation. The method and apparatus utilize a pressure vessel into which the influent waters are moved under pressure. The pressure within each vessel is maintained within a desired range, and an oxygen stream is pumped into the influent waters. To insure proper contact with the oxygen, detention time within the vessel is provided; fine bubble diffusers are used to inject the oxygen stream; and these diffusers are spaced at various locations and, if desired, at varying levels within the vessel. Means are provided to vary the quantity of the oxygen stream introduced into the vessel at various points, as well as to vary the percentage of oxygen in the oxygen stream itself. The apparatus and method may be employed at various locations in a sewer system as intermediate steps to prevent excessive build-up of odor or corrosion, or with additional equipment, such as tapered aeration tanks, aerobic digesters and the like, to form a complete treatment plant.

CROSS-REFERENCE TO RELATED APPLICATION

This is a continuation-in-part of U.S. patent application Ser. No. 845,927, filed June 25, 1969, now abandoned.

BACKGROUND OF THE PRESENT INVENTION

The present invention relates to method and apparatus for the treatment of influent waters such as sewage, other types of waste materials and other waters requiring oxygen.

Prior to the present invention various oxygen transfer, treatment and stabilization techniques were used in sewage treatment plants with perhaps the most common being the use of open aeration tanks into which the sewage would be introduced. Large quantities of air were then bubbled through the sewage to provide the required amount of oxygen for treatment.

Problems inherently arise in the utilization of such methods and apparatus, however. They require not only large quantities of air, but relatively long detention time for the sewage in the various tanks. Such tanks also require relatively large areas of land. Due to the fact that they are open to the atmosphere, odor problems are usually present.

Further difficulties are met in that septic sewage has a corrosive effect and acts to destroy the apparatus used to treat it, as well as sewage lines, pumps and other related equipment used to gather and convey sewage to the treatment plant. This problem is well known in the field of sewage treatment and arises due to the fact that sewage containing biological waste generally exists in an oxygen-starved environment. Such an environment favors the propagation of facultative or anaerobic bacteria, the excreta of which is of an unstable chemical nature leading to the creation of active and destructive chemical compounds in such sewer systems or hydraulic channels. The primary problem consists of the production and presence of hydrogen sulphite gas either free or dissolved within the sewage. The production of this gas also produces the offensive odor normally associated with sewage collection and treatment.

Sewage such as described above has a high biochemical oxygen demand (BOD), as well as chemical oxygen demands, and the result is the previously mentioned odor and the corrosion problem consisting of chemical attack on the conductor pipes and lines, lift station equipment, including both electrical and mechanical components, and the lift station structures. This problem begins in the outer collection system and increases from that point on due to the excessive detention of waste with a high BOD in the collection system and a depleted oxygen content. Furthermore, pumping such as occurs at all lift stations increases the problem. As can be imagined, by the time sewage reaches the final treatment plant, the problem has generally increased manyfold, thus requiring even further treatment than what would normally be required to reduce BOD to an acceptable level.

By way of definition, the normal standard used for measurement of the biochemical oxygen demand is defined as the amount of dissolved oxygen necessary in milligrams per liter (mg./l.) to support aerobic bacteria to the point of complete stabilization of all organic material in a water borne waste. Historically, testing BOD has been limited to measurement of oxygen consumption over a 5-day test period with results being expressed as 5-day BOD in milligrams per liter or parts per million (p.p.m.). In some areas, this 5-day BOD is required to be no more than 6.5 parts of oxygen per million parts of liquid waste (p.p.m.). The Texas State Health Department standard is 20 p.p.m. Such minimum 5-day BOD is required before the sewage treatment plant effluent can be allowed to be discharged into a river, stream or the like.

Generally, therefore, the primary problems that sewage treatment faces today may be stated as follows. As residential and population centers have grown, the progress in sewage treatment techniques and equipment have not kept in pace. As a result, many of the treatment systems are obsolete or undersized. Many plants today need capacity but have insufficient land area available due to the considerable amount of area required for conventional waste treatment plants. Furthermore, due to the corrosion mentioned above, the cost of maintaining and operating such plants which include numerous items of equipment is considerable. A further limiting factor in the amount of waste that can be treated in a day is the necessary detention time, or flow-through period, required to achieve satisfactory reduction of the 5-day BOD and settleable solids.

SUMMARY OF THE PRESENT INVENTION

The present invention provides apparatus and method which may be, for example, used for the elimination or the substantial reduction of the offensive odors and the corrosive effect normally associated with sewage collection and treatment and accomplish this result with minimum of cost. A pressure vessel is utilized for the introduction of oxygen into the sewage. In the preferred embodiment, fine bubble diffusers are used to accomplish this by introducing oxygen into the waste under pressure and in sufficiently small bubbles to provide optimum contact with the waste and optimize oxygen transfer into a solution. The pressure within the vessel in the preferred embodiment is maintained at or about 15 pounds per square inch gage (p.s.i.g.), and a pump is employed to introduce the sewage into the vessel under pressure. Adequate control means are provided to maintain the pressure in the tank at the desired range, while providing means to vent off the exhaust gases, as well as means to remove treated solids that have settled out. The apparatus needed to accomplish this takes up relatively little land area when compared to conventional techniques.

The method and apparatus mentioned above and more fully described herein may be used in the treatment of sewage generally for two purposes. The first is at intermediate stations within the collection system for the pre-treating of the sewage ahead of existing sewage treatment plants to periodically reduce and maintain at a minimum the corrosive effect and the gas odors that are created and that tends to increase as the sewage moves through the collection system. The second is to incorporate this equipment with additional equipment as the main part of a complete sewage treatment plant.

Free oxygen is toxic to anaerobic bacteria and by the elimination of this bacteria, the generation of hydrogen sulphide in the waste is stopped until the oxygen is again depleted. The present invention provides an extremely efficient and effective means of contacting and transfering oxygen. The result is to furnish an oxygen enriched bacteriological environment by dissolving the oxygen under pressure in the sewage in accordance with "Henry's law" to the end that a favorable environment is created for the growth and propagation of aerobic bacteria whose ingestion of organic waste found in the sewage results in a visibly inert, oxydized end product. Such a product is relatively odorless and non-corrosive. This product may be distinguished from that produced by an oxygen-starved environment which would favor the propagation of an anaerobic bacteria, the result of which would be the creation of hydrogen sulphide gas and other active and destructive chemical compounds.

An object of the present invention is to provide improved method and apparatus for the treatment of influent waters such as sewage, other types of waste materials and other waters requiring oxidation.

Still another object is to provide such method and apparatus which employs components that are relatively simple and are economical in manufacture and operation, and which provide for long service life with low maintenance downtime and costs.

Another object of the present invention is to provide such method and apparatus which utilizes a pressure vessel into which the influent waters are fed in controlled amounts, and oxygen, in either a pure or diluted state, is introduced into the influent waters in an extremely efficient manner, thus providing method and apparatus which will produce better than satisfactory 5-day BOD requirements with less land area and detention time required and with an increased capacity over conventional systems.

Still another object is to provide apparatus and method which may be used either at a final sewage treatment plant or for pre-treatment of sewage at intermediate locations, such as lift stations.

Still another objects is to provide high capacity treatment method and apparatus having sufficient controls and flexibility to vary the process as needed to meet varying demands, and which will function in a reliable manner through long periods of use.

These and other objects, features and advantages will become apparent from a review of the following description, when taken in conjunction with the accompanying drawings.

BRIEF DESCRIPTION OF THE DRAWINGS

In the accompanying drawings, like reference numerals designate like parts throughout the several views, which views are as follows.

BRIEF DESCRIPTION OF THE PREFERRED EMBODIMENTS

Referring more particularly to the drawings wherein similar reference characters designate corresponding parts throughout the several views, the apparatus and method of the invention have been illustrated and hereinafter described with reference to the treatment of sewage. It will be understood, however, that such application of the invention has been given by way of illustration only and the method and apparatus of the invention are not limited to the treatment of sewage, but rather are capable of employment in the treatment of other influent waters such as, for example, and not limitation, waste water, discharges from petroleum or chemical plants, and other liquids requiring oxidation.

Moreover, the term "oxygen stream" as used hereinafter includes any gas stream containing oxygen, such as, for example, air, gases containing smaller proportions of oxygen than air, gases containing larger proportions of oxygen than air, oxygen enriched air, or a pure oxygen stream. Also, when the present invention is used to treat other than sewage, oxygen may not be the sought-for ingredient in the treating gas. Thus other types of gases may be used; and accordingly, "oxygen stream" shall also be defined to include such other gases.

Figure 1:
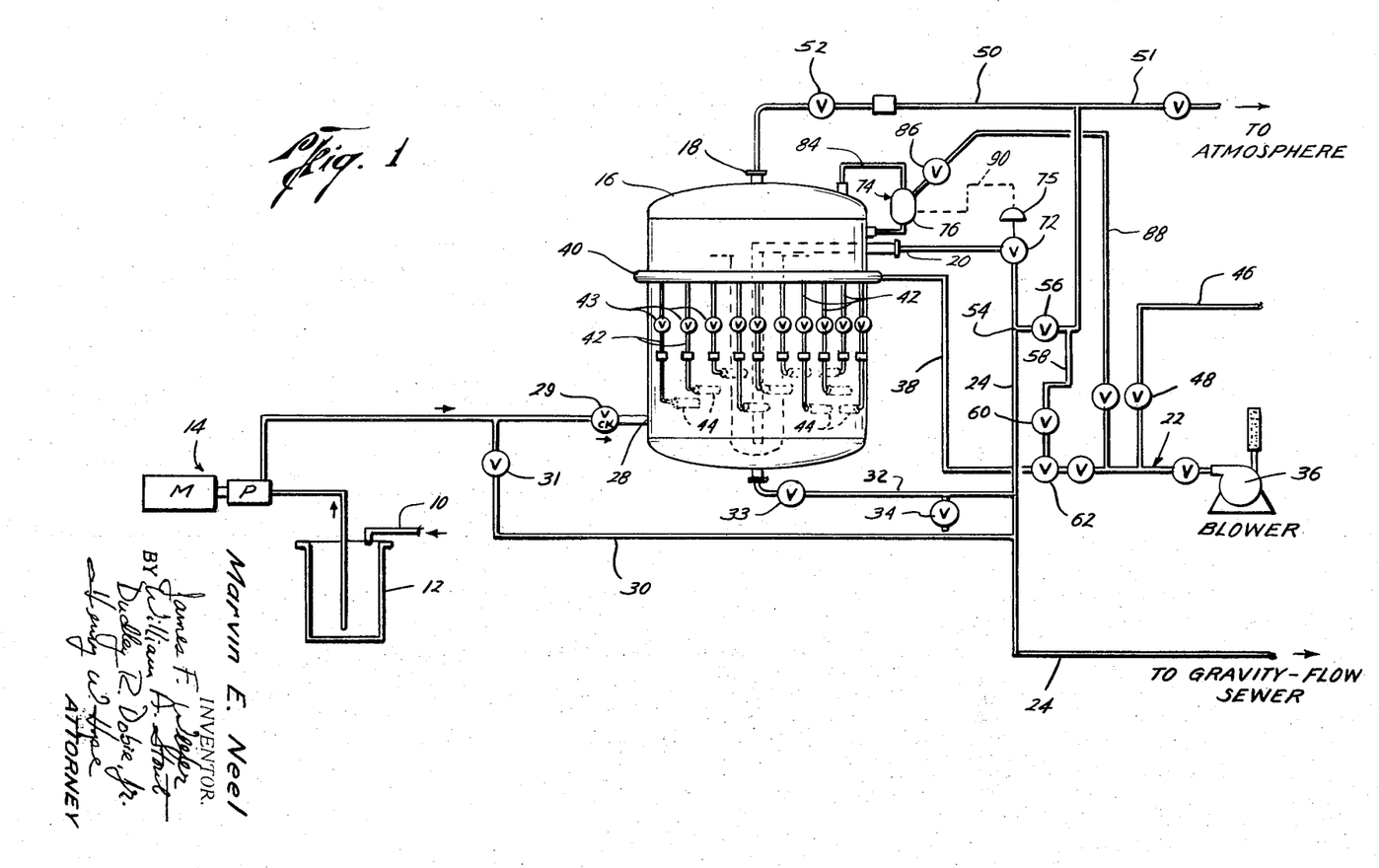
FIG. 1 is a schematic view of the present invention as incorporated into an intermediate sewage pre-treating station.

Referring to FIG. 1, the embodiment of the present invention as incorporated into intermediary or pre-treating station is shown and is comprised generally of an inlet sewer line 10 leading to a wet well 12, a motor-driven lift pump 14, a pressure vessel or aerobic digester 16, a vent 18, an outlet 20, an oxygen stream supply means generally indicated by the numeral 22 and an outlet force main 24 which leads to a gravity-flow sewer line (not shown). In addition, appropriate lines are employed for conveying the sewage and treated sewage, as well as valving, controls and the like which will be generally described below.

Discussing now in greater detail the apparatus shown in FIG. 1, a line 26 lead from the pump 14 to vessel inlet 28 which is tangentially connected near the bottom of the vessel 16. A bypass 30 connects the inlet line 26 to the outlet force main 24 to bypass the system if desired. Appropriate valving 29 and 31 control the flow through these lines 26 and 30, respectively. A drain 32 for settleable solids exits from the bottom of the vessel 16 and leads to the main 24. If desired, a control valve 33 and a drain or pump connection 34 can be incorporated into the outlet 32.

Figure 3:
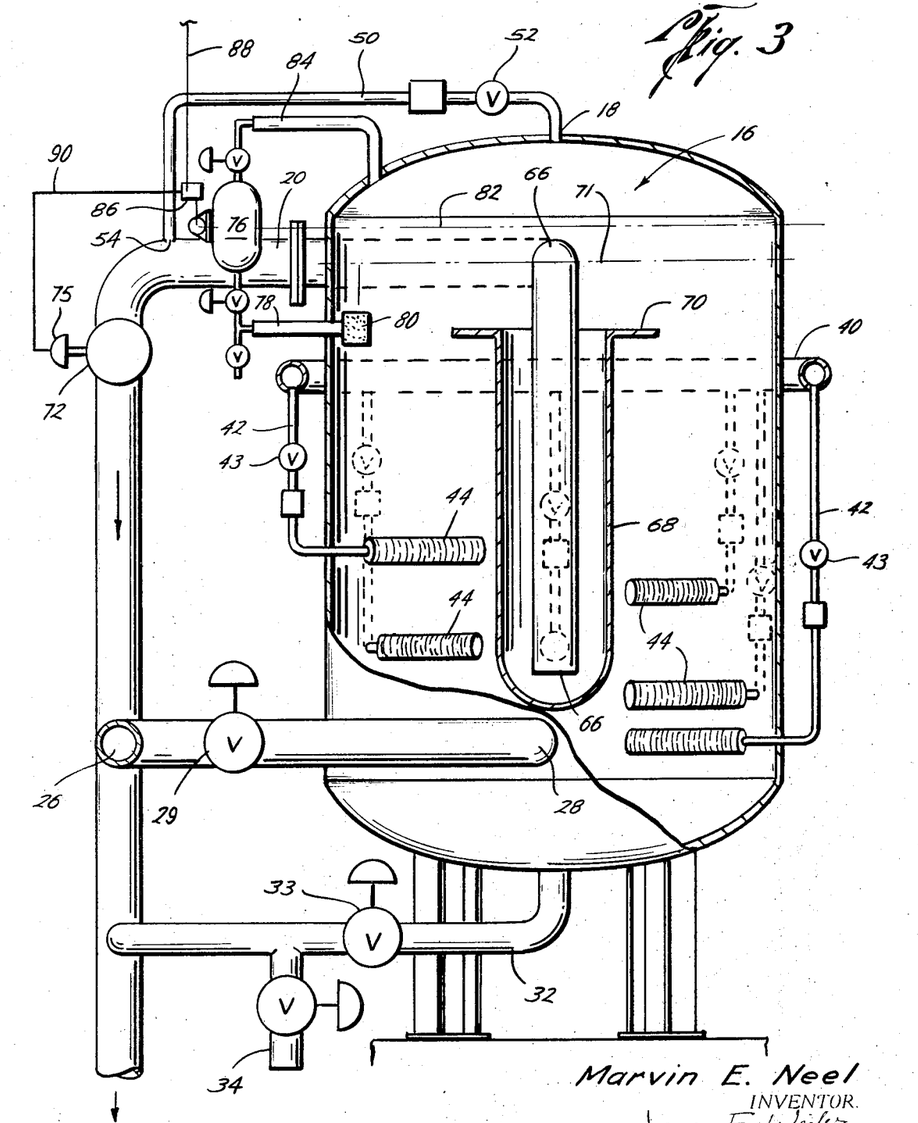
FIG. 3 is an elevation view of one embodiment of a pressure vessel used in the present invention with a portion thereof being broken away for purposes of illustration.
Figure 4:
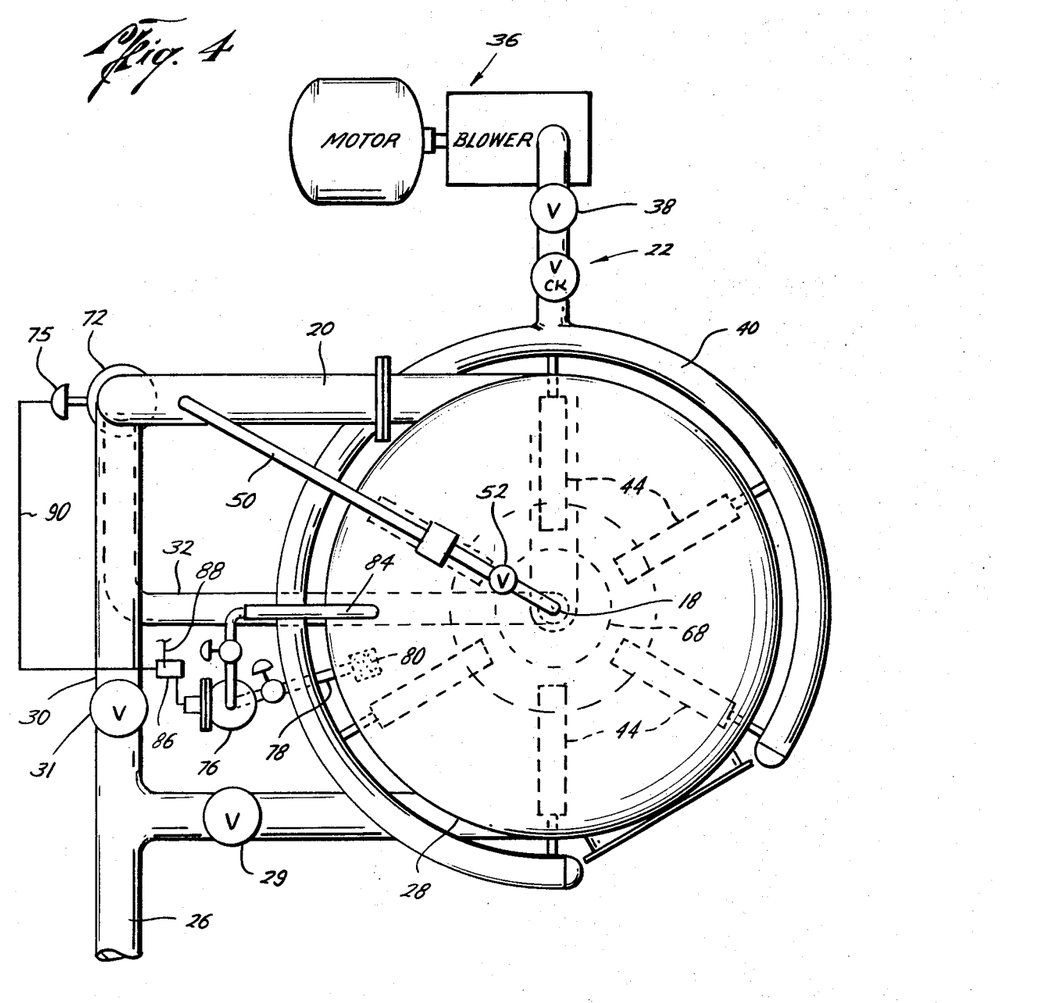
FIG. 4 is a plan view of the pressure vessel shown in FIG. 3.

Discussing now the air supply system 22, reference should also be made to FIGS. 3 and 4 which show this supply system as well as the pressure vessel itself in greater detail. The oxygen stream supply 22 is comprised of a motor-driven air blower 36 which is connected by line 38 to a manifold or header 40. Depending from the header 40 are a plurality of air supply lines 42, each connecting the header with an air nozzle, which in this case is a fine bubble diffuser 44. The diffusers 44 are spaced about within the vessel 16 at various levels between the inlet 28 and the outlet 20. Appropriate flow meters and control valves, both of which are indicated by the numeral 43, are carried by the lines 42 so that individual control to each of the diffusers is provided. A second line 46 leads from a supply of pure oxygen such as an oxygen bottle feed and is connected to the air supply line 38 with appropriate valving 48.

Discussing now the vent 18, a line 50 leads from this vent and contains a pressure relief valve 52. This line 50 connects to the outlet force main 24 as at 54 with a valve 56 controlling the flow into the force main. A line 58 leads from the line 50, through a control valve 60 and connects into the line 38 through the low pressure tap on a venturi meter 62. This provides for recirculation of the oxygen when pure oxygen is being used. The connections of the vent line to the air supply line 38 are not shown on FIG. 3 or 4 for purposes of simplicity.

Discussing now the outlet 20 for the liquid sewage, it is connected near the top of the vessel 16. An extension member 66 extends generally radially into the center of the vessel and from there downwardly to a point near the bottom of the vessel. Concentrically disposed about this vertical portion of the extension member 66 is a cylindrically shaped dam means or weir 68 which has an enclosed bottom. This weir 68 is supported within the vessel 16 by appropriate brackets (now shown) so that its uppermost edge 70 is approximately even with the strainer 80. This uppermost edge of the weir may be maintained within the vessel 16. A float or liquid level control valve generally indicated by the numeral 74 controls the opening and closing of this valve 72. This control valve 74 has a float chamber 76 which communicates with the interior of the pressure vessel through line 78 and strainer 80. The center line 82 of the float chamber is located above the center line 71 of the outlet. A pressure equalization line 84 leads from the top of the vessel to the float chamber 76. The second part of the control valve 74 is an air switch illustrated by the numeral 86. A line 88 brings air under pressure from the line 38 to the float chamber of the valve 74 and a line 90 leads from the float chamber to the diaphragm 75 on the diaphragm operated valve 72.

Discussing now the operation of a preferred embodiment of the present invention as it may be utilized in a pretreating station, it should first be understood that sewage normally flows through sewer lines by gravity. As will be readily understood, the elevation of the sewage must be periodically raised so that the gravity flow can continue without the sewer line reaching a depth which would be uneconomical for a variety of reasons. Accordingly, lift stations are positioned at various points throughout a sewer network to accomplish this purpose. The present invention ideally suited for application at such lift stations, and the embodiment of FIG. 1 has been so situated.

The influent or raw sewage flows through the line 10 and into the wet wall 12. The lift pump 14 lifts the sewage from the well to a higher elevation, and in accordance with the present invention, injects this sewage into the pressure vessel 16 through the inlet 28. Preferably, the inlet 28 is tangentially disposed relative to the periphery of the pressure vessel 16, thereby imparting movement to the flow of sewage as it moves into the vessel 16. The introduction of sewage into the vessel 16 may be controlled either by the pump 14 or the valve 29 or from the back pressure of air or oxygen at the top of the vessel 16.

The outlet 20 is positioned above the inlet and, therefore, there will be a certain detention time before the sewage can reach the appropriate level for removal. During this detention time, an oxygen stream is fed by the air blower through the diffusers 44. In the preferred embodiment, the air blower 22 is provided means (not shown) to furnish an oil free stream. In addition, the preferred embodiment is provided with a three-micron, intake filter and muffler to remove all solid particles from the stream. The oxygen diffusers 44 are placed about the periphery of the vessel 16 at varying levels and extend generally radially inwardly therefrom so that all of the sewage passing therethrough will be contacted. Because of the various locations for these diffusers, the upward spiraling of the sewage will allow intimate contact between the oxygen stream and the sewage. The finely dispersed air bubbles from the diffusers will pass by gravity upwardly through the liquid waste. This will also bring about a more rapid and more efficient absorption of the oxygen by the waste, thereby satisfying the 5-day BOD in a more efficient and rapid manner. In addition, the heavy solids that are contained in the waste will begin to settle out and will move by gravity to the bottom of the vessel. These solids are then removed through the line 32. Light solids will go over the weir with the liquid stream.

Discussing now the exit of the sewage from the outlet 20, after a predetermined amount of time, treated sewage will reach the upper edge 70 of the weir 68. Sewage will then begin to flow into the bottom of the weir, thereby forming a free liquid/gas interface from which location it can be withdrawn, through the lowermost end of the outlet extension member 66. It will be readily understood that the portion of the sewage flowing over the edge 70 of the weir will have traveled a significant distance from the inlet and will have remained within the pressure vessel for a set length of time, depending upon the size of the vessel, the volume of the pump 14, etc. By the control of these factors, the detention time can be properly determined to insure sufficient contact and adsorption of the oxygen supplied through the diffusers 44.

If the level continues to rise above the edge 70 of the weir 68, it will soon reach the center line 82 of the float chamber 76. The level within the float chamber rises as does the level within the vessel due to the communication between the chamber and the vessel, and as the center line is reached, the float will move, thereby shifting the valve 86. This shift in position will align the valve ports such that the line 88 is in communication with line 90 and the air stream will be allowed to flow to the diaphragm chamber of the control valve 72, opening the valve. Flow through the outlet will result due to the positive pressure within the vessel 6. As long as the liquid level remains above the predetermined level at which the float actuates the switch 86, the outlet will remain open. When this level drops below the predetermined maximum level, however, the float will return the control switch 86 to its normal position, thus shutting off the flow of air to the diaphragm chamber, thereby closing the control valve 72. Such control apparatus is, of course, well-known in the art, and no further explanation need by given here. It should also be noted that the levels at which the float opens and closes the outlet may be different levels so that, once opened, the outlet will stay open as the liquid levels drop below line 82 or even outlet 20.

Turning now to the vent 18, the valve 52 is a pressure operated valve which opens when it is subjected to pressure of a predetermined level from the pressure vessel side of the valve. Any undissolved oxygen which might have been introduced into the vessel, inert constituents of air should an air stream be used, other gases given off by the sewage and the oxidation reaction are thus vented from the vessel when a predetermined pressure level has been reached. In this manner, the pressure level within the vessel can be maintained as desired. It has been found that optimum results are obtained within a certain pressure range, and, of course, it is desirable to maintain the pressure in the vessel within this range.

This is accomplished by the introduction of the air through the diffusers 44 at the appropriate pressure as well as pumping the sewage through the inlet 28 also at this pressure. The outlets 18 and 20 at the top of the vessel are normally closed to prevent pressure reduction within the vessel, and they open only under the prescribed conditions set forth previously. The gas vented through the line 50 either flows to the liquid waste discharge main 24 and into the underground gravity sewer or in the alternative and when pure oxygen is being used, the valve 56 may be closed and the valve 60 opened so that this gas boosted in pressure by means (not shown) re-enters line 38 and is recirculated through the vessel. A third alternative is a line 51 which includes an appropriate valve which may be used for venting the gases to the atmosphere in controlled amounts. When this procedure is used, pressure in the vessel may be maintained by air pressure at the top, thus eliminating the use of the control valve.

Should an overload be experienced within the vessel for any reason, the inlet valve 29 may be partially closed and the valve 31 opened to allow the sewage to bypass the vessel. Furthermore, should the results obtained in the vessel 16 not reach the necessary levels, treated sewage can be recirculated from the main 24 to the inlet line 11 for retreatment in the vessel 16.

Other controls and variables are also present within this system to give the system greater flexibility to meet varying demands. For example, in some situations, an oxygen stream made up of air is satisfactory. In these situations, the air blowers 36 may be used exclusively to supply the oxygen stream with the valve 48 leading from the pure oxygen source being closed. Alternatively, the valve 48 may be opened in varying degrees to enrich the air from the blower as desired. Where necessary, the valve 48 may be opened to a degree so that the oxygen stream flowing into the vessel is essentially pure oxygen. If pure oxygen is desired, a pure oxygen source such as oxygen tanks containing oxygen under 250–500 pounds pressure may be connected to the line 46. By opening the valve 48 and shutting off the air blower, a pure oxygen stream can be obtained and the pressure of this stream held within the desired pressure range by means of the valve 48.

It should also be noted that the line 58 and valve 60 allow for the gases from the vessel to be recirculated, thus providing for recirculation of excess oxygen, thereby providing for 100% utilization of the oxygen being fed to the process unit. This recirculating flow is normally used only when a pure oxygen stream is being used.

As will be understood, therefore, the air-oxygen flow control valves can vary the percentages of oxygen to range from 20% to 100%, depending upon the optimum range for the process. In addition, the air-oxygen flow control valves provide for very closely controlled rates of flow of air or oxygen to the various regions of the pressure tank. The controls 43 in the lines 42 give utmost flexibility in selective introduction of the oxygen stream into the pressure vessel, thus providing optimum feed for varying concentrations of liquid waste in the various regions of the tank.

With the present invention as disclosed in FIG. 1, the preferred embodiment would operates at pressures between 15 to 35 p.s.i.g. in the tank. The various valves controlling the oxygen stream feed, the sewage feed and the vents and outlets would be set accordingly. The oxygen streams introduced into the vessel contain percentages of oxygen bearing from 20% to 100%, depending upon the optimum range for the particular conditions existing within the tank. In addition, the preferred embodiment is sized such that the detention time of the sewage within the pressure vessel is 12 to 25 minutes, depending upon the degree of treatment desired. The diffusers 44 were sized for bubble diameter of 5 microns which allowed maximum interface contact and absorption between the air-liquid surfaces. This seemed to furnish the optimum condition for supporting aerobic bacteria activity and preventing or eliminating anaerobic bacteria activity, thereby preventing the generation of hydrogen sulphide gas and acid conditions. It should be noted that extreme agitation occurs within the vessel from the volume of air introduced through the diffusers in small bubbles. This breaks up solids into very small particles, and thereby provides for even more initmate contact between the waste and oxygen being supplied.

Experimental equipment in accordance with the present invention was set up under the following conditions:

| | | |
|---|---|---|
| Volume of pressure vessel | gals | 10,590 |
| Average detention time in vessel | mins | 15 |
| Average air pressure | p.s.i.g | 16 |
| Average liquid temperature | ° F | 65 |
| Air volume to vessel | cu. ft. per min | 110 |
| Oxygen volume | do | 24.2 |

The test period extended over 45 days and the following results were obtained. There was an 80% reduction of 5-day BOD with an average incoming 5-day BOD of 100 p.p.m. The effluent from the pressure vessel contained an average atmospheric dissolved oxygen content of 9.0 p.p.m.

In addition, the above equipment, when used with an existing conventional sewage treatment plant which is located to design capacity resulted in an effluent with an average 5-day BOD requirement of 5 p.p.m. which is 75% below the Texas State Health Department standards of 20 p.p.m. 5-day BOD.

It has been found that the above discussed apparatus which is shown in FIG. 1 when placed in a lift station will, using oxygen from air, provide dissolved oxygen in the order of 20-25 parts per million (p.p.m.) or more if desired depending upon the size of the equipment, and this will provide sufficient oxygen in the waste to provide under normal conditions a one to two-hour period of time within which no hydrogen sulphide will be generated. This, of course, will vary depending upon the volume and type of sewage being treated. Accordingly, appropriate tests should be made from the effluent from the vessel to determine the time span before hydrogen sulphide will again be generated by the organic waste. Knowing this, engineers can then determine the location of such intermediate pretreating stations throughout the sewer system. By proper location of such stations, the offensive odors and the corrosive and damaging effect resulting from sewage handling and treatment can be reduced to the very minimum. The resulting increased savings in maintenance and replacement of sewer liner, pumps, etc., can be enormous, thus paying for the installation of such pretreating stations within a relatively short period of time.

Figure 2:
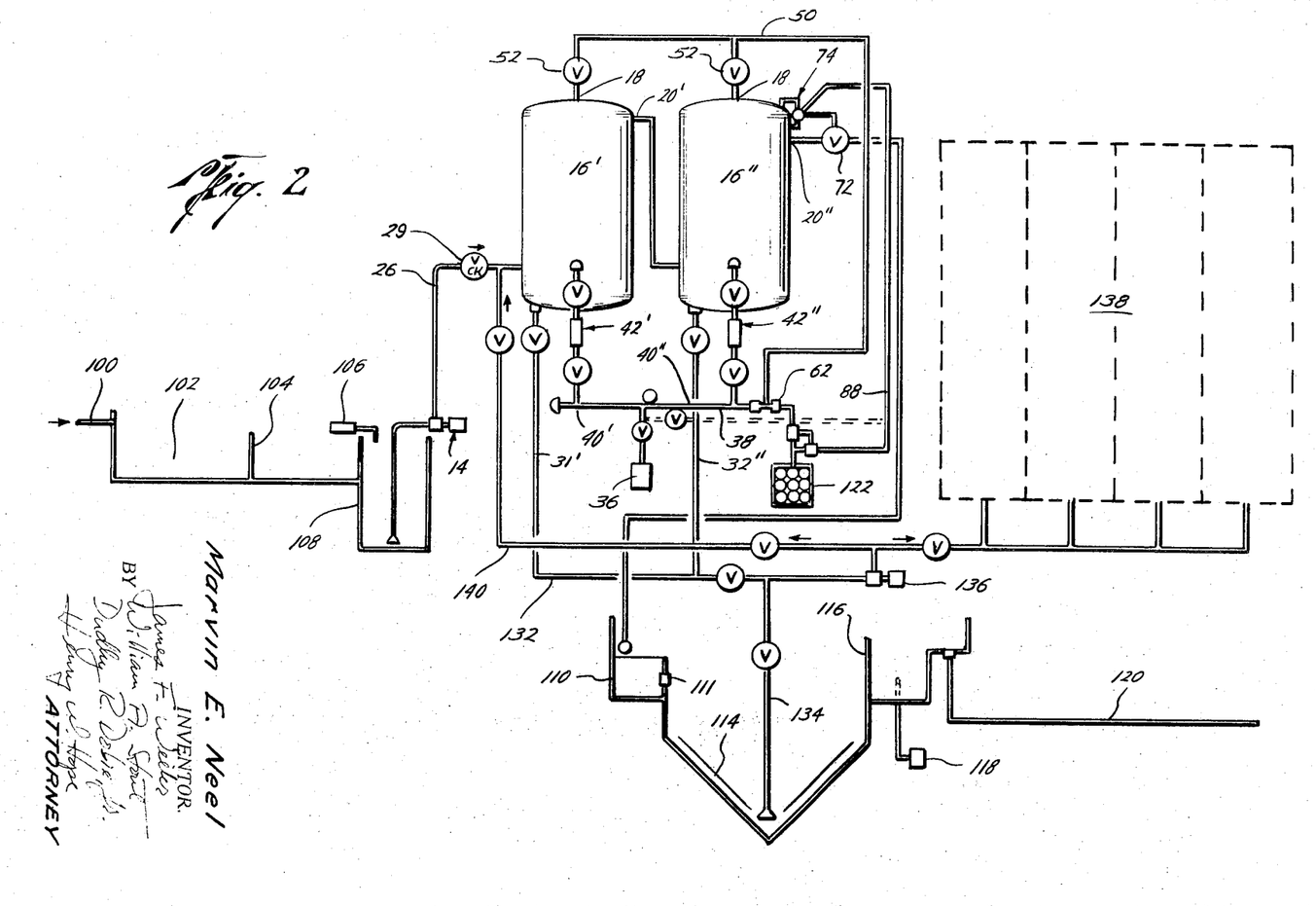
FIG. 2 is a schematic view of the present invention as utilized in a sewage treatment plant.

As has been previously pointed out, however, the present invention may also be incorporated with additional equipment to form a complete sewage treating plant, rather than pretreating stations, or it may be used in conjunction with an existing plant. Such a complete plant is shown in FIG. 2 and is comprised of the following pieces of equipment. The gravity flow inlet sewer 100 brings the influent or raw sewage into a grit chamber 102. A weir 104 brings about an initial separation of the solids from the liquid sewage, and a comminutor 106 reduces the solid particles in the sewage to a very small size as the sewage passes into the wet well 108. A lift pump 14 draws the sewage from the bottom of the well 108 and moves it through inlet line 26 and check valve 29, and into the first pressure vessel or aerobic digester 16'. An outlet 20' leads from the first vessel 16 and into a second vessel 16". The outlet 20" leaves the second vessel 16" and carries the liquid sewage to a distributor header located in an inlet compartment 110 of a stilling basin 112. A level controlled valve 72 is located in the outlet line 20″ is controlled by a float valve in the same manner as described with regard to the embodiment of FIG. 1. Flow through outlet 20′ is not controlled in this embodiment, however, except by the levels in the two vessels 16′ and 16″. A wall with slots 111 separates the compartment 110 from the main compartment of the stilling basin where gravity separation aided by a sludge scraper 114 brings about further separation between what is now treated sewage and sludge. As the treated sewage flows through the slotted wall 111, the level will gradually rise to the level of a second weir 116 which divides a chlorination basin 112a from the main stilling basin 112. Chlorine is provided to this basin 112a by the chlorinator 118, and finally, the treated effluent leaves this basin 112a through the line 120 through which it is carried to the receiving stream.

Returning now to the pressure vessels, the oxygen streams is supplied by the line 38 from the oxygen supply 122. In this application, a pure oxygen stream is used, but where satisfactory results can be obtained, the oxygen bottle feed could be replaced with the previously discussed air compressor. The oxygen headers 40′ and 40″ are merely schematically represented in this figure, as are the other elements. It should be noted, however, that the particular configuration of the header 40 in the previously discussed embodiment is not necessary or required by the present invention. Oxygen is dispersed within the vessel in the same manner, however.

As with the previous embodiment, a vent 18 is located on each of the vessels 16′ and 16″, each vent having a pressure control valve 52 and connecting with an oxygen recovery header 50. In view of the fact that a pure oxygen supply is used in this embodiment, this header or line 50 returns the gas vented from the pressure vessels to the oxygen stream supply line 38 for recirculation.

In this application, the sludge formed in the bottom of the pressure vessels is drawn off through the drain lines 31′ and 32″ which connect with a sludge draw off header 132. A line 134 removes sludge from the stilling basin 112. A sludge lift pump 136 coveys the sludge to sludge drying beds 138 where the sludge is dried and is disposed of by conventional means such as burning or sanitary land fill. For further treatment of the sludge, however, the appropriate valves are operated to direct the sludge through the sludge reseeding line 140 to the inlet of the first pressure vessel 16′ for recirculation.

FIG. 2, therefore, sets forth an application of the present invention as it may be used for a sewage treatment and disposal plant. In such an application, the pressure vessels are preferably operated within a range of from 18 to 30 p.s.i.g., and the diffusers designed to introduce 30 to 100 standard cubic feet per minute of oxygen (or air) with a maximum bubble size of 5 microns.

Figures 5, 6, 7:
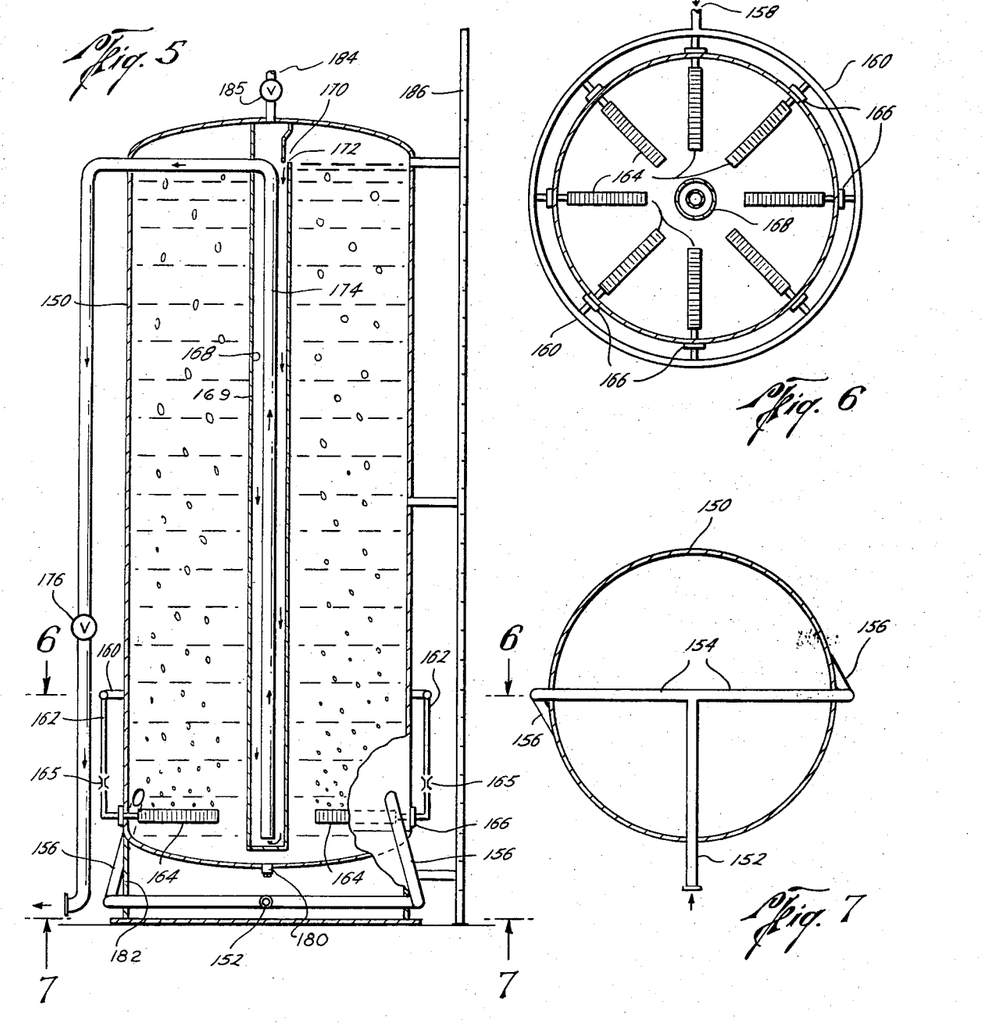
FIG. 5 is an elevation view of a second embodiment of a pressure vessel which is the subject of this invention having a portion thereof shown in broken lines.
FIG. 6 is a partial, section view of the pressure vessel shown in FIG. 5 as seen on section lines 6—6.
FIG. 7 is a partial, plan view of the vessel as seen along section lines 7—7 in FIG. 5, and principally showing the liquid inlet feed means.

Turning now to FIGS. 5 through 7, a more simplified embodiment of the invention is therein shown. As illustrated, such embodiment comprises a pressure vessel 150 having at its bottom a sewage inlet 152 connected to cross-members 154 which lead to the inlet nozzles 156. The inlet nozzles 156, as illustrated, may be tangentially connected to the vessel 150 and located at diametrically opposed points on the periphery of the vessel 150.

An oxygen stream is provided by an inlet 158 connected to a header 160 which, although illustrated as being annular and completely encircling the vessel 150, only alternatively be less than a complete annulus and surround only a portion of the vessel 150. Conduitry 162, containing fixed flow balancers 165 (for example, venturis) adapted to insure uniform gas flow distribution through the diffusers 164, connects the circular header 160 with the diffusers 164 which are carried by the diffuser mountings 166. As can be seen, the diffusers 164 in this embodiment are in a single plane, although equally spaced around the entire cross-section of the vessel 150, and horizontally disposed. It should be noted, however, that the diffusers 164 may lie in one plane as shown in FIG. 5 or, alternatively be arranged in more than one plane as in FIG. 3. In fact, two levels of diffusers have operated quite satisfactorily. Furthermore, the diffusers 164 may be either located above or below the sewage inlets 156.

A well 168, contained within a wall 169, extends downwardly from the top of the vessel 150 and is located in the center of the vessel 150. Openings 170 are located near the top of the vessel 150 to form weirs 172. Concentrically disposed within the well 168 is the discharge conduit 174 which has an inlet end adjacent to, but spaced above, the bottom wall 207 of the well 168 and projects externally of the vessel 150 and has its other end adapted for discharge to other conduitry, a discharge point or subsequent treating vessel. A valve 176 may be installed in the conduit 174, if desired, or, in certain situations, where required for back pressure.

A settled solids outlet 180 is arranged at the bottom of the vessel 150 within the skirt 182; an air vent 184, containing an air vent valve 185, is located at the top of the vessel 150. A ladder and platform 186, are provided for reasons believed to be apparent.

Figure 8:
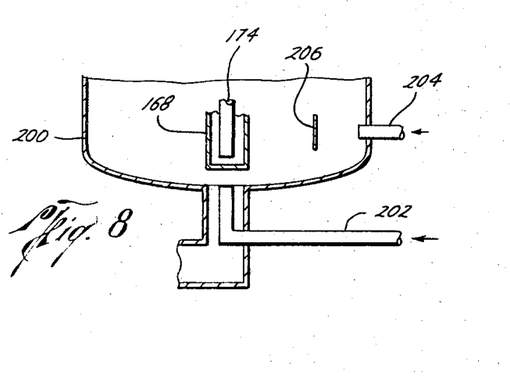
FIG. 8 is a partial elevation view of a vessel with portions thereof being broken away to show additional inlet feed means.

FIG. 8 illustrates two alternatives inlets for introducing liquid into a pressurized vessel, shown fragmentarily as 200, which may be of construction similar to that of the vessel 16 shown in FIG. 3 or the vessel 150 shown in FIG. 5. A first inlet 202 is concentrically located at the bottom of the vessel 200. A second, alternative inlet 204 extends generally radially of the vessel 200 for radially introducing liquid into the latter. When straight-in inlets such as 202 and 204 are utilized, baffle means such as 206 may be employed for insuring equal distribution of the introduced liquid. However, as alternative to the baffle 206, the bottom wall 207 of the well 168 may be used when suitable.

Returning to the FIG. 5 embodiment of the invention, said embodiment has been operated with very successful results. A vessel 150 was constructed having a diameter of eight feet and a height of approximately sixteen feet. Wall 169 of well 168 extended from the top of the vessel to within a few inches of the bottom. Sewage was pumped through a conventional pump means at approximately 32 pounds pressure, and then through a gate valve into piping that carried the fluid to the vessel 150. The air vent valve 185 was set to maintain the gases at the top of the vessel 150 at a pressure of approximately 18 p.s.i., such valve 185 being set and infrequently adjusted. Due to pressure loss in the line, the sewage entered the bottom of the vessel 150 through inlet 152 at a pressure of approximately 30 p.s.i. or, at least, in excess of two atmospheres. The oxygen stream was introduced from a source of 32 p.s.i. with an estimated pressure loss through the diffusers 164 of 1 p.s.i. Thus, the oxygen stream was introduced at approximately 31 p.s.i. The diffusers 164 utilized were 5-micron air filters.

The apparatus was used on both a continuous and intermittent flow stream, and the reaction within the vessel observed through a window placed in the vessel. As the sewage was introduced through the inlets 156, it moved about the side wall of the vessel until it reached a diffuser. The high velocity oxygen stream introduced through the diffusers created a sheet of bubbles rising to the surface, from which point it returned to the lower regions of the vessel, until it reached the next diffuser. Thus a current ran between the diffusers which created a rapid movement from the bottom to the top of the vessel and then down again. At the same time, the sewage gradually moved inwardly toward the weir 172 and thence into the well 168.

The result was that the sewage, and particularly the solids contained therein, were maintained homogenously in suspension within the solution. Additionally, the high velocity of the sewage stream and the oxygen stream created agitation, as well as shearing and tearing up of the large pieces of suspended matter in the sewage. This, aided by continuous recycling of the matter through the various pressures present throughout the height of the vessel, allowed the oxygen to treat the liquid water and solid waste in a more efficient manner.

One approach that the present invention takes is that a pressure vessel is used which has throughout its length a relatively large open passageway with no close clearances to block the flow. The pressure is maintained due to the use of the well 168, weirs 172, and the maintenance of the pressure in the top of the vessel 150. This brings about a very obvious advantage in that solids that are not, or that cannot be, broken up may move through the system without clogging or blocking close clearances.

It is due to this construction that the sewage receives its unique treatment. The combined (a) circular and (b) up-and-down movements of the sewage from pressure of approximately 30 p.s.i. to approximately 18 p.s.i. create a very favorable condition for the contacting of the sewage with oxygen. Furthermore, this movement combined with the high velocity of the liquid and oxygen streams will shred or tear the solids to an average size 50 to 70 microns so that they may be more effectively contacted by the oxygen. The end result is that biological treatment is effected faster at these pressures, and the present apparatus and method will rapidly and completely saturate the sewage with oxygen, maintain oxygen saturation under pressure and maintain constant the desired oxygen concentration in solution.

Further, nitrogen, present when using air, moving through the liquid will enhance scouring and release of byproduct gases resulting from the treatment. By the same token an air stream moving through the liquid releases or separates greases, oils and detergents, thereby cleaning the treated liquid. These released or separated elements are later removed at subsequent treating vessels such as a clarifier.

Another observed result is that the bubbles from the micron diffusers stay in suspension better and longer due to the described movement of the waste materials and the release and separation of certain undersired elements as mentioned above. The end result is that bacteria become more active under such conditions. Bacteria generally live and die within 20 minutes, which is the approximate dwell time in the vessel for the sewage. By providing an improved and beneficial oxygen environment and intimate mixing of bacteria and waste materials the growth of bacteria is accelerated, which in turn, enhances the removal of organic waste materials. Accordingly, the present apparatus as shown in FIG. 5 obtains over twice the efficiency of more conventional sewage treatment operations. The treated fluid then leaves the vessel saturated with dissolved oxygen. By way of example, most conventional systems will at best obtain only 4 p.p.m. of dissolved oxygen in their treated effluent, whereas the present invention provides a dissolved concentration substantially equivalent to the oxygen solubility at the partial pressure maintained in the vessel. For example, using 30 p.s.i.g. air the oxygen solubility in water at 25° centigrade, is of the order of 25 parts per million saturation. Furthermore, the saturated oxygen condition must be replenished and maintained in the solution to continue to provide optimum treatment of the sewage which may require, for example, ten times the absolute oxygen solubility provided by the invention. This is accomplished by the present invention, whereas prior art devices find difficulty in providing 8 p.p.m. of dissolved oxygen, using air, much less in maintaining this condition.

It should also be noted that settled sludge may be removed from the vessel of this embodiment through outlet 180, reactivated in a separate basin and then recirculated in a manner well known in the art to be used to re-seed the bacteria. The larger particles are either removed through the bottom of the vessel, or afloat to the surface and are skimmed off the top at a subsequent step in the process.

As can be seen from the above, therefore, the present invention is readily adapted to achieve the objectives set forth at the outset. It has been found that the apparatus and method disclosed herein, when installed and operated properly, will reduce the cost of waste treatment from 50% to 60%. This is brought about due to the efficient diffusion of oxygen directly into the sewage, as well as for other reasons, such as relatively smaller land area required due to the compactness of the present plant, relative simplicity of parts which provide for low initial in operating and maintenance costs, a reduction in the corrosive and destructive components of the sewage itself, thereby resulting in a longer service life for this equipment as well as for existing equipment such as sewer lines, pumps and the like, and the elimination of the use of chemicals in this operation. Method and apparatus have been disclosed which will reduce the 5-day BOD of the organic waste treated to below regulatory standards with a decrease in costs, time required in the processing unit and with the resulting increases in volume treated.

What is claimed is:

1. A method of treating sewerage and similar influent waters, comprising the steps of supplying an influent water under pressure into a pressure vessel, separately supplying an oxygen stream under pressure into said pressure vessel through fine bubble diffuser means, whereby said oxygen stream is introduced into the influent water within said pressure vessel, maintaining the pressure in said pressure vessel at a level at least about 15 p.s.i.g., agitating the influent water and oxygen stream in said pressure vessel solely by fluid forces to effect treatment of the influent water by said oxygen stream in said pressure vessel, causing the thus treated water to flow over dam means into a well within said pressure vessel, discharging such treated water from said well when the liquid level in said pressure vessel attains a predetermined level whereby a gas-liquid interface is maintained in said pressure vessel, and venting gas from said pressure vessel, separately from the discharged treated water and from above said gas-liquid interface, when the gas pressure in said pressure vessel attains a predetermined pressure.

2. A method according to claim 1, wherein the treated water is upwardly discharged from adjacent the lower end of said well.

3. A method according to claim 2, wherein the influent water is supplied to the lower end of said pressure vessel, and said treated water is caused to flow into said well adjacent the upper end of said pressure vessel.

4. A method according to claim 1, wherein the treated water is discharged through a discharge pipe which extends downwardly in said well to adjacent the lower end thereof and is adapted to receive the treated water adjacent the lower end of said well.

5. A method according to claim 1, wherein said oxygen stream is supplied to said fine bubble diffuser means through a header extending around said pressure vessel.

6. A method according to claim 1, wherein said oxygen stream is employed for said agitation.

7. A method according to claim 1, wherein said oxygen stream is introduced to the pressure vessel at locations spaced across the cross-section of said pressure vessel.

8. A method according to claim 1, wherein said oxygen stream is introduced to the pressure vessel at locations spaced along the length of the pressure vessel.

9. A method according to claim 1, wherein said oxygen stream is supplied to said pressure vessel intermediate the upper and lower ends of said pressure vessel.

10. A method according to claim 1, further comprising the step of discharging settleable solids from said pressure vessel separately from the vented gas and the treated water.

11. A method according to claim 1, further comprising the step of recirculating gas vented from said pressure vessel.

12. A method according to claim 1, further comprising repeating each of the beforegoing steps at points in an influent water collection system where the biochemical oxygen demand of the influent water exceeds a predetermined level.

13. A method according to claim 1, wherein said oxygen stream is supplied intermediate the supply of influent water to the pressure vessel and the discharge of treated water from the pressure vessel.

14. A method according to claim 1, wherein the interior of said pressure vessel is free of solid material fill.

15. An apparatus for treating sewage and similar influent waters, comprising a pressure vessel having an inlet, means for introducing an influent water under pressure into said pressure vessel through said inlet, fine bubble diffuser means for separately introducing an oxygen stream into said pressure vessel whereby the oxygen stream is introduced to the influent water in said pressure vessel, supply means for supplying an oxygen stream under pressure to said fine bubble diffuser means, vent means for venting gas from adjacent the upper end of said pressure vessel, means controlling the venting of gas from said pressure vessel through said vent means permitting such venting when the gas pressure in said pressure vessel attains a predetermined pressure, dam means within said pressure vessel defining a well in said pressure vessel, said inlet and said fine bubble diffuser means being connected to the portion of said pressure vessel external to said well, said well communicating with such portion of said pressure vessel external thereto to receive water treated by said oxygen stream from such portion of said pressure vessel over said dam means, treated water discharge means separate from said vent means for discharging such treated water from said pressure vessel, said treated water discharge means being operatively associated with said well to discharge the treated water from said well, and means for controlling the discharge of treated water through said treated water discharge means to cause treated water to be discharged therethrough responsive to the liquid level in said pressure vessel attaining a predetermined level, the interior of said pressure vessel being free of mechanical agitating means whereby the influent water and introduced oxygen stream in said pressure vessel are agitated solely by fluid forces.

16. An apparatus according to claim 15, wherein at least the portion of said pressure vessel external to said well is free of solid material fill.

17. An apparatus according to claim 15, wherein said treated water discharge means comprises discharge conduit means extending into said well for upwardly receiving treated water from adjacent the lower end of said well.

18. An apparatus according to claim 17, wherein said vent means is adjacent the upper end of said pressure vessel, and said well extends generally vertically in said pressure vessel and commuicates with the portion of said pressure vessel external thereto adjacent the upper end of said pressure.

19. An apparatus according to claim 18, wherein said well is generally centrally within said pressure vessel.

20. An apparatus according to claim 15, wherein said fine bubble diffuser means comprises a plurality of fine bubble diffusers, and said oxygen stream supply means comprises a header extending around said pressure vessel for at least a portion of its circumference and a conduit extending from said header to each of said fine bubble diffusers for supplying the oxygen stream thereto.

21. An apparatus according to claim 20, further comprising valve means in each of said conduits for controlling the supply of the oxygen stream therethrough.

22. An apparatus according to claim 20, wherein treated water discharge means comprises discharge conduit means extending into said well for upwardly receiving treated water from adjacent the lower end of said well.

23. An apparatus according to claim 15, further comprising outlet means adjacent the lower end of said pressure vessel for discharging settleable solids from said pressure vessel.

24. An apparatus according to claim 15, further comprising a second said pressure vessel connected to said treated water discharge means to receive treated water therefrom.

25. An apparatus according to claim 15, wherein said pressure vessel is vertically elongated.

26. An apparatus according to claim 15, wherein said fine bubble diffuser means comprises fine bubble diffusers spaced along the length of said pressure vessel.

27. An apparatus according to claim 15, wherein said fine bubble diffuser means comprises fine bubble diffusers spaced across the cross-section of said pressure vessel.

28. An apparatus according to claim 15, wherein said inlet is adjacent the lower end of said pressure vessel, and said fine bubble diffuser means comprises fine bubble diffusers intermediate said inlet and the upper end of said pressure vessel.

29. An apparatus according to claim 15, further comprising means for recirculating gas discharged through said vent means back into said pressure vessel.

References Cited
UNITED STATES PATENTS

| | | | |
|---|---|---|---|
| 3,232,434 | 2/1966 | Albersmeyer | 210—17 X |
| 2,559,462 | 7/1951 | Pirnie | 210—218 X |
| 3,477,581 | 11/1969 | Stearns | 210—220 X |
| 3,049,489 | 8/1962 | Ciabattari | 210—15 |
| 2,811,258 | 10/1957 | Schleyer et al. | 210—205 X |
| 3,307,701 | 3/1967 | Krofta | 210—199 X |
| 3,347,537 | 10/1967 | Morgan | 210—15 X |
| 3,529,725 | 9/1970 | Fifer | 210—220 |
| 935,303 | 9/1909 | Greth | 210—124 X |
| 3,133,878 | 5/1964 | Kober | 210—7 X |
| 3,462,275 | 8/1969 | Bellamy | 210—15 X |

OTHER REFERENCES

Metcalf, L., et al.: American Sewerage Practice, vol. III, Disposal of Sewage, 3rd ed., McGraw-Hill (New York), 1935, pp. 69–70.

SAMIH N. ZAHARNA, Primary Examiner

T. G. WYSE, Assistant Examiner

U.S. Cl. X.R.

210—61, 199, 205, 218; 261—124